US012766515B2

(12) United States Patent
Antoine et al.

(10) Patent No.: US 12,766,515 B2
(45) **Date of Patent: *Oct. 20, 2026**

(54) WELL STRUCTURES FOR BIOSENSOR DEVICES

(71) Applicant: Analog Devices International Unlimited Company, County Limerick (IE)

(72) Inventors: Christophe Antoine, Newbury (GB); Youri Victorovitch Ponomarev, Rotselaar (BE); Julie Byard, Huntingdon (GB)

(73) Assignee: Analog Devices International Unlimited Company, County Limerick (IE)

( * ) Notice: Subject to any disclaimer, the term of this patent is extended or adjusted under 35 U.S.C. 154(b) by 566 days.

This patent is subject to a terminal disclaimer.

(21) Appl. No.: 18/362,753

(22) Filed: Jul. 31, 2023

(65) Prior Publication Data

US 2025/0041864 A1 Feb. 6, 2025

(51) Int. Cl.
*B01L 3/00* (2006.01)

(52) U.S. Cl.
CPC ......... *B01L 3/5085* (2013.01); *B01L 2200/12* (2013.01); *B01L 2300/0636* (2013.01)

(58) Field of Classification Search
CPC ................. B01L 2300/0636; B01L 2300/0645
See application file for complete search history.

(56) References Cited

U.S. PATENT DOCUMENTS

| | | | | | |
|---|---|---|---|---|---|
| 4,734,184 | A * | 3/1988 | Burleigh | A61B 5/14542 | 204/411 |
| 5,286,364 | A * | 2/1994 | Yacynych | C12Q 1/002 | 205/198 |
| 6,440,296 | B1 | 8/2002 | Stanzel et al. | | |
| 6,872,297 | B2 | 3/2005 | Mansouri et al. | | |
| 8,391,945 | B2 | 3/2013 | Say et al. | | |
| 8,608,921 | B2 | 12/2013 | Li et al. | | |
| 9,260,684 | B1 * | 2/2016 | Egeler | C12M 23/12 | |
| 9,309,550 | B2 | 4/2016 | Cooper et al. | | |
| 9,458,488 | B2 | 10/2016 | Johnson et al. | | |
| 9,567,630 | B2 | 2/2017 | Davis et al. | | |
| 2005/0272989 | A1 | 12/2005 | Shah et al. | | |
| 2007/0134721 | A1 | 6/2007 | Laitenberger et al. | | |

(Continued)

FOREIGN PATENT DOCUMENTS

EP 0 539 912 A2 5/1993

OTHER PUBLICATIONS

Extended European Search Report Issued on Nov. 20, 2024 in European Patent Application No. 24191842.4, Filed Jul. 30, 2024.

*Primary Examiner* — Nathan A Bowers
(74) *Attorney, Agent, or Firm* — KNOBBE, MARTENS, OLSON & BEAR, LLP

(57) ABSTRACT

A biosensor structure may include a well structure comprising a first well and a second well, wherein a geometry of the well structure impacts where a solution dispensed into the well structure is located. A biosensor structure may include an electrode configured to sense an analyte in the solution, the electrode disposed at a bottom of the well structure. A biosensor structure may include a membrane positioned on the electrode and on at least part of a bottom surface of the well structure.

13 Claims, 13 Drawing Sheets

(56) References Cited

U.S. PATENT DOCUMENTS

| | | | | |
|---|---|---|---|---|
| 2008/0207465 | A1* | 8/2008 | Ravkin | B01L 3/5085 506/9 |
| 2012/0036921 | A1* | 2/2012 | De Coulon | G01N 27/4045 73/61.61 |
| 2014/0054170 | A1 | 2/2014 | Tsukahara et al. | |
| 2018/0304221 | A1* | 10/2018 | Goodyear | B01J 19/00 |
| 2019/0100786 | A1* | 4/2019 | Kwon | C12M 25/14 |
| 2019/0120830 | A1 | 4/2019 | Hoffman | |
| 2023/0304958 | A1* | 9/2023 | Berduque | G01N 27/3272 |
| 2024/0074682 | A1* | 3/2024 | Fernandez de Avila | A61B 5/14539 |

* cited by examiner

WELL STRUCTURES FOR BIOSENSOR DEVICES

BACKGROUND

Technical Field

The disclosed technology relates to well structures for biosensor devices.

Description of Related Technology

Well structures are frequently used in biosensing applications, for example, when performing potentiometry or amperometry measurements. However, there are technical challenges associated with current well structures. Accordingly, there is a need for improved well structures.

SUMMARY OF CERTAIN INVENTIVE ASPECTS

The innovations described in the claims each have several aspects, no single one of which is solely responsible for its desirable attributes. Without limiting the scope of the claims, some prominent features of this disclosure will now be briefly described.

In some aspects, the techniques described herein relate to a biosensor structure including: a well structure including a first well and a second well, wherein a geometry of the well structure impacts where a solution dispensed into the well structure is located; an electrode configured to sense an analyte in the solution, the electrode disposed at a bottom of the well structure; and a membrane positioned on the electrode and on at least part of a bottom surface of the well structure.

In some aspects, the techniques described herein relate to a biosensor structure, wherein at least part of the membrane is disposed directly on the bottom surface well structure.

In some aspects, the techniques described herein relate to a biosensor structure, further including an electrolyte disposed between the membrane and the electrode.

In some aspects, the techniques described herein relate to a biosensor structure, wherein the membrane is arranged such that a liquid in the biosensor structure can only reach the electrode by passing through the membrane.

In some aspects, the techniques described herein relate to a biosensor structure, further including a second membrane, wherein the first membrane is within the first well, and wherein the second membrane is within the second well.

In some aspects, the techniques described herein relate to a biosensor structure, wherein the first well is disposed within the second well such that the first well and the second well extend to different depths relative to a surface of the substrate, wherein the second well has a greater diameter than the first well.

In some aspects, the techniques described herein relate to a biosensor structure, wherein the first well includes a tapered sidewall.

In some aspects, the techniques described herein relate to a biosensor structure, wherein the second well includes a tapered sidewall.

In some aspects, the techniques described herein relate to a biosensor structure, wherein the well structure includes a step extending from a sidewall of the first well to a sidewall of the second well.

In some aspects, the techniques described herein relate to a biosensor structure, wherein the well structure includes a first wall having a first height and a first width, and the first wall separates the first well and the second well.

In some aspects, the techniques described herein relate to a biosensor structure, further including a second wall having a second height and a second width, the second wall defining an outer boundary of the second well.

In some aspects, the techniques described herein relate to a biosensor structure, wherein the first wall is at a first distance from a center of the well structure, wherein the second well is at a second distance from the center of the well structure, wherein the second distance is greater than the first distance.

In some aspects, the techniques described herein relate to a biosensor structure, wherein the electrode is an ion-selective electrode.

In some aspects, the techniques described herein relate to a biosensor structure, wherein the first well and the second well are concentric.

In some aspects, the techniques described herein relate to a biosensor structure, wherein the well structure includes a surface with nanostructure thereon to decrease adhesion of the solution.

In some aspects, the techniques described herein relate to a biosensor structure, wherein the well structure includes a surface with microstructure thereon to decrease adhesion of the solution.

In some aspects, the techniques described herein relate to a biosensor structure including: a well structure including a first well and a second well, wherein the first well and the second well are stepped concentric wells; an electrode configured to sense an analyte in a solution in the well structure; and a membrane positioned on the electrode.

In some aspects, the techniques described herein relate to a biosensor structure, wherein the first well includes a tapered sidewall.

In some aspects, the techniques described herein relate to a biosensor structure including: a well structure including a first well, a second well, and a pillar disposed between the first well and the second well; an electrode configured to sense an analyte in a solution in the well structure; and a membrane positioned on the electrode, wherein the first well and the second well are concentric, and wherein the second well surrounds the first well in plan view.

In some aspects, the techniques described herein relate to a biosensor structure, wherein a height of the pillar is less than a total depth of the well structure.

In some aspects, the techniques described herein relate to a biosensor structure including: a well structure having a bottom surface, a side surface, and an open top; a first membrane having a top surface and a bottom surface; and an electrode configured to sense an analyte in a solution in the well structure, wherein the electrode is disposed on the bottom surface of the well structure, wherein the bottom surface of the membrane is disposed on the electrode and on the bottom surface of the well structure, and wherein at least one of bottom surface and the side surface includes a textured feature.

In some aspects, the techniques described herein relate to a biosensor structure, wherein the textured feature is a microstructure.

In some aspects, the techniques described herein relate to a biosensor structure, wherein the textured feature is a nanostructure.

In some aspects, the techniques described herein relate to a biosensor structure, wherein the textured feature has a non-circular edge.

In some aspects, the techniques described herein relate to a biosensor structure, wherein the textured feature is included in a periodic pattern of textured features.

In some aspects, the techniques described herein relate to a biosensor structure, wherein the textured feature decreases surface adhesion of the solution to the well structure.

In some aspects, the techniques described herein relate to a biosensor structure, wherein the side surface of the well structure includes the textured feature.

In some aspects, the techniques described herein relate to a biosensor structure, wherein the bottom surface of the well structure includes the textured feature.

In some aspects, the techniques described herein relate to a biosensor structure, wherein the side surface of the well structure includes a plurality of outward depressions, wherein the plurality of outward depressions include the textured feature.

In some aspects, the techniques described herein relate to a biosensor structure, wherein a side surface of the first membrane is partially exposed at or near the outward depressions.

In some aspects, the techniques described herein relate to a biosensor structure, wherein the well structure is a multi-well structure.

In some aspects, the techniques described herein relate to a biosensor structure, wherein the multi-well structure includes stepped concentric wells.

In some aspects, the techniques described herein relate to a biosensor structure, wherein a first well of the stepped concentric wells includes a tapered sidewall.

In some aspects, the techniques described herein relate to a biosensor structure, wherein the multi-well structure includes: a first well; a second well; and a pillar disposed between the first well and the second well; wherein the second well has a different diameter than the first well.

In some aspects, the techniques described herein relate to a biosensor structure, wherein a height of the pillar is less than a total depth of the well structure.

In some aspects, the techniques described herein relate to a biosensor structure including: a multi-well structure having a bottom surface, a side surface, and an open top, the multi-well structure including a first well and a second well; a first membrane having a top surface and a bottom surface; and an electrode configured to sense an analyte in a solution in the well structure, wherein the electrode is disposed on the bottom surface of the well structure, wherein the bottom surface of the membrane is disposed on the electrode and on the bottom surface of the well structure, and wherein at least one of bottom surface and the side surface includes a textured feature.

In some aspects, the techniques described herein relate to a method of sensing an analyte using a biosensor, the method including: dispensing a solution into a well structure of the biosensor via an open top of the well structure, wherein a surface of the well structure includes at least one of a nanostructure or a microstructure; and sensing the analyte in the solution in the well structure with an electrode of the biosensor, wherein a membrane of the biosensor is over the electrode.

In some aspects, the techniques described herein relate to a method, wherein the well structure is a multi-well structure.

In some aspects, the techniques described herein relate to a method, wherein the multi-well structure includes concentric wells.

In some aspects, the techniques described herein relate to a method, wherein sensing the analyte in the solution includes detecting at least one of a potential or a current. Abstract of the Disclosure A biosensor structure may include a well structure having a bottom surface, a side surface, and an open top. A biosensor structure may include a first membrane having a top surface and a bottom surface. A biosensor structure may include an electrode configured to sense an analyte in a solution in the well structure, wherein the electrode is disposed on the bottom surface of the well structure, wherein the bottom surface of the membrane is disposed on the electrode and on the bottom surface of the well structure, and wherein at least one of bottom surface and the side surface includes a textured feature.

For purposes of summarizing the disclosure, certain aspects, advantages, and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will be described, by way of non-limiting example, with reference to the accompanying drawings.

FIG. 6D is another example with a texture feature.

FIG. 7C shows a side view of the well through the line A-A of FIG. 7B, in which the membrane is in contact with the sidewall.

FIG. 7D shows a side view of the well through the line B-B of FIG. 7B, in which the membrane is not in contact with the sidewall.

DETAILED DESCRIPTION OF CERTAIN EMBODIMENTS

Figure 1A:
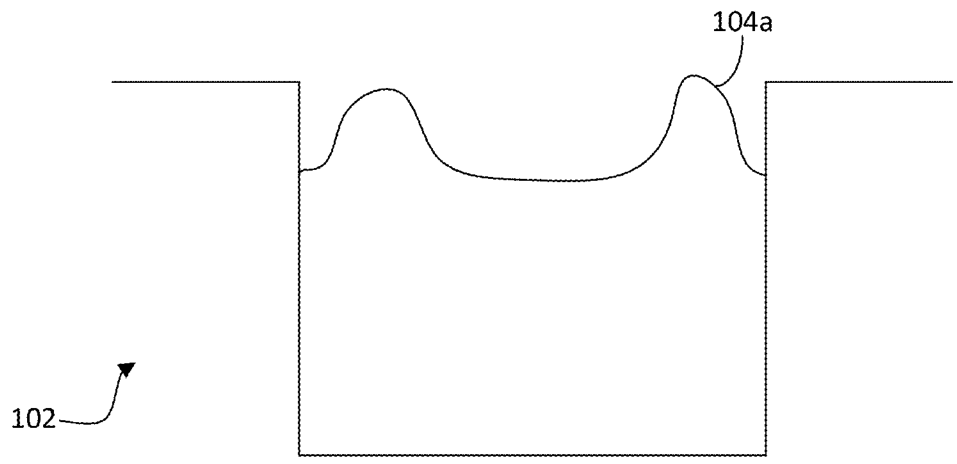
FIG. 1A illustrates an example of a "coffee cup stain" pattern.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the illustrated elements. Further, some embodiments can incorporate any suitable combination of features from two or more drawings.

Detecting and/or quantifying the presence of analytes in solution is significant in various fields, such as environmental monitoring, medical diagnostics, pharmaceutical analysis, and so forth. There are various techniques for detecting analytes, such as potentiometry and amperometry. For example, in potentiometry, changes in potential can be monitored to detect and/or quantify analytes. Amperometry is based on the measurement of current that can result from an electrochemical reaction involving a target analyte. For example, a working electrode can be a site for a reduction-oxidation (redox) reaction. As the target analyte is oxidized or reduced, a current can be generated that is proportional to the concentration of the target analyte. Amperometry can use a three-electrode configuration that can include a working electrode, reference electrode, and counter electrode. As mentioned above, the working electrode can be the site where redox reactions occur. The reference electrode can provide a stable reference potential. In some embodiments, a potential can be kept constant while current is measured. The current measured, the time for the current to become stable, and so forth can depend upon the thickness of a membrane covering an electrode. For example, the distance traveled by an analyte can impact performance of a biosensor device, such as causing it to take longer to reach a steady current. In some embodiments, the thickness and/or uniformity of a membrane can be controlled to achieve desired precision, accuracy, stabilization times, and so forth.

While these and other techniques can be used for the detection and/or quantification of analytes, obtaining accurate results can be challenging. In some cases, a well structure can be used for analyte detection. For example, one or more electrodes can be disposed in the bottom of a well and can be used for analyte detection and/or quantification. In some embodiments, a membrane can be provided over the one or more electrodes. For example, the membrane can allow the passage of certain analytes while blocking the passage of other materials. In some cases, multiple membranes can be used, for example in a multi-layer biosensor. In some embodiments, one or more filter layers can be used to reduce and/or prevent the detection of certain compounds that can result in inaccurate results.

Aspects to this disclosure relate to well structures for biosensor devices. Such well structures can include multiple wells and/or moats to geometrically define where dispensed liquid or paste will be located on a device. The well structure is separated into at least a first well and a second well. The well structure can include a plurality of concentric wells. In certain embodiments, concentric wells include stepped wells that each extend progressively deeper into the well structure. According to some embodiments, concentric wells include wells that are separated from each other by a separating structure, such as a pillar or another suitable structure. With a well structure that includes the concentric wells, a biosensor device can cause uniformity of liquid within the well structure to be increased. This can result in more accurate measurements. Biosensor devices can include an electrode (which may, for example and without limitation, be an ion-selective electrode (ISE), for example an enzyme electrode, glass membrane ISE, crystalline membrane ISE, or ion-exchange resin ISE) and/or a membrane, where the membrane is over at least part of a bottom surface of the well structure. The biosensor device can detect and/or measure a presence of a bioanalyte in a solution in the well structure.

Aspects of this disclosure relate to biosensors that include nanostructures and/or microstructures on a surface of a well. The microstructures and/or nanostructures can increase or decrease surface adhesion, hydrophobicity, and/or other properties of the well. In certain embodiments, a sidewall of a well can have depressions or other features that can improve the uniformity of the surface of a membrane, increase an exposed area of a membrane, and/or provide other benefits.

Various materials can be used in forming a well for analyte detection and/or quantification. For example, a well can be made using a variety of substrates. For example, and without limitation, a substrate material can include a polymer, epoxy, polyimide, ceramic, silicon, liquid crystal polymer, or the like. Well structures in accordance with any suitable principles and advantages disclosed herein can be formed in and/or on a substrate with any of these suitable materials.

Biosensor devices can be configured to detect a wide variety of analytes. For example, a biosensor device with a well structure disclosed herein can be configured to detect one or more of sodium ions, chlorine ions, potassium ions, calcium ions, oxygen, carbon dioxide, glucose, lactate, or the like. A biosensor can include one or more electrodes to sense an analyte. For example, the one or more electrodes can be used to sense a presence of an analyte, a concentration of an analyte, etc. In some embodiments, a biosensor device can be used for performing blood gas analysis. Biosensor devices with well structures disclosed herein can be potentiometric sensing devices and/or amperometric sensing devices.

The present disclosure provides various well structures that can be used in a biosensor device for sensing an analyte in a sample matrix.

When designing a well structure, several considerations can be taken into account. For example, a design can be enhanced and/or optimized to achieve desired adhesion, thickness, uniformity, and so forth. It can be beneficial to have strong adhesion between layers, membranes, well surfaces, and so forth. For example, strong adhesion between a membrane and an electrode can impede and/or prevent water and/or other liquids from flowing around or under a membrane and making contact with the electrode. Good adhesion can also prevent or limit the presence or formation of voids, gaseous pockets, and so forth that can interfere with testing and/or measurement accuracy.

Membrane thickness can play a significant role in the performance of an analyte detection system. For example, in some embodiments, it can be desirable to have a relatively uniform membrane thickness. In some embodiments, an analyte detection system can include an ion-selective membrane (ISM) and/or an ion-selective electrode (ISE). In some embodiments, it can be significant for the ion-selective membrane to be relatively smooth and/or to have a relatively even thickness. In some embodiments, an ion-selective membrane, filter, or other barrier or membrane can be deposited on top of an electrode in a liquid state.

In some embodiments, the smoothness of liquid layers can be a significant factor in the performance of an analyte detection system. In some embodiments, an analyte detection system can use multiple liquid layers. In some embodiments, the smoothness of one or more intermediate liquid layers can influence the surface profile of a topmost liquid layer.

In an analyte detection system that uses wells, the well geometry can play a significant role in the performance of the system. For example, a membrane or other liquid (e.g., a sample matrix) placed in the well can have a non-flat surface. For example, "coffee cup stain" patterns, concave shapes, and so forth can be formed. FIG. 1A illustrates an example of a membrane in a well with a "coffee cup stain" pattern. FIG. 1A illustrates a side view of a cross-section of a well 102 with a membrane therein. As can be seen in FIG. 1A, the surface 104*a* of the membrane is not smooth but rather starts at a first height near the edges of the well 102, then increases in height, before decreasing in height as the surface approaches the middle of the well 102.

Figure 1B:
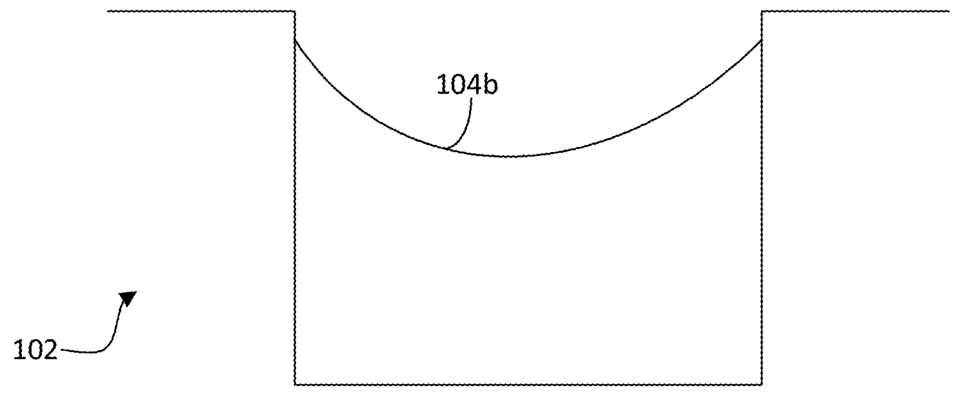
FIG. 1B illustrates an example of a concave surface profile.

FIG. 1B illustrates an example of a membrane with a concave surface profile 104*b*, in which the membrane is thicker near the edges of the well 102 than in the center of the well 102. For example, the surface of the well 102 can be hydrophilic, lipophilic, etc.

Figure 1C:
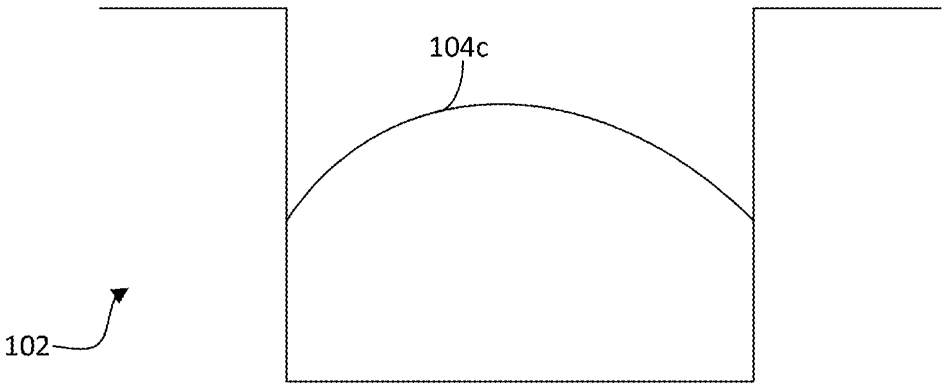
FIG. 1C illustrates an example of a membrane with a convex surface profile.

FIG. 1C illustrates an example of a membrane with a convex surface profile 104*c*, in which the membrane is thicker in the middle of the well 102 than at the edges of the well 102. A surface profile as shown in FIG. 1C may be observed when, for example, the surface of the well 102 is hydrophobic, lipophobic, etc.

Figure 1D:
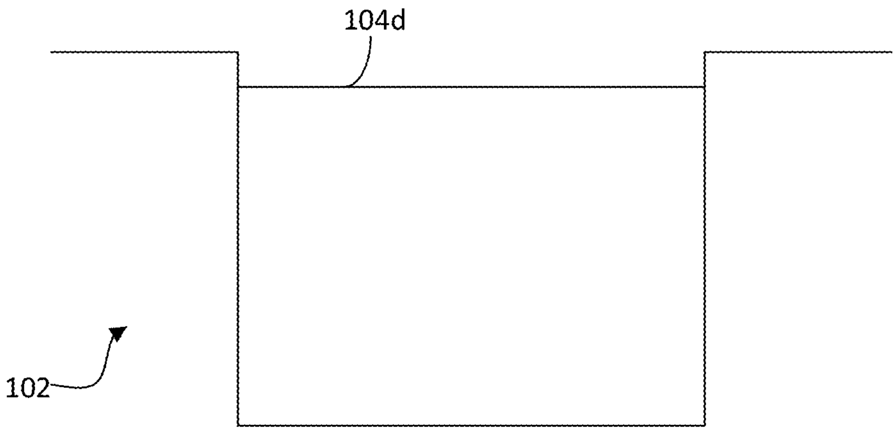
FIG. 1D illustrates an example well with a membrane having a flat surface.

FIG. 1D illustrates an example well 102 with a membrane having a flat surface 104*d*. The flat surface 104*d* can be desirable because, for example, it can provide a uniform path length from the surface 104*d* to an electrode at the bottom of the well (not shown in FIG. 1C). The surface 104*a* is an idealized surface. Achieving or approximating such a surface can present significant technical challenges. As described herein, in some embodiments, well geometry and/or one or more other characteristics of a well structure can achieve a flatter surface, to improve adhesion, to improve fluid flow, and/or other to achieve other advantages as described herein.

In some embodiments, a well structure can have an overall height of from about 5 micrometers to about 500 micrometers, for example from about 5 micrometers to about 100 micrometers. In some embodiments, a membrane can have an overall height of from about 5 micrometers to about 100 micrometers, for example about 10 micrometers to about 40 micrometers. In some embodiments, a well structure can have a diameter of from about 0.1 micrometers to about 5 mm, for example about 180 nanometers. In some embodiments a membrane disposed in the well structure can have a height that is the same or about the same as the height of the well structure or less than the height of the well structure. In some embodiments, a membrane disposed in the well structure can have a diameter that is the same or about the same as the diameter of the well structure, or can have a diameter that is less than the diameter of the well structure.

Issues related to thickness uniformity can be mitigated at least in part based on the geometry of the well. For example, in some embodiments, a well structure can include pillars, steps, rings, and so forth that can be used to achieve a flatter surface and/or a more uniform thickness of a membrane and/or a liquid (e.g., a sample matrix) deposited thereon. Multiple wells (also referred to herein as moats) can be formed and can define locations where liquids, pastes, and so forth may be located within a device. Such wells can be concentric.

Figure 2A:
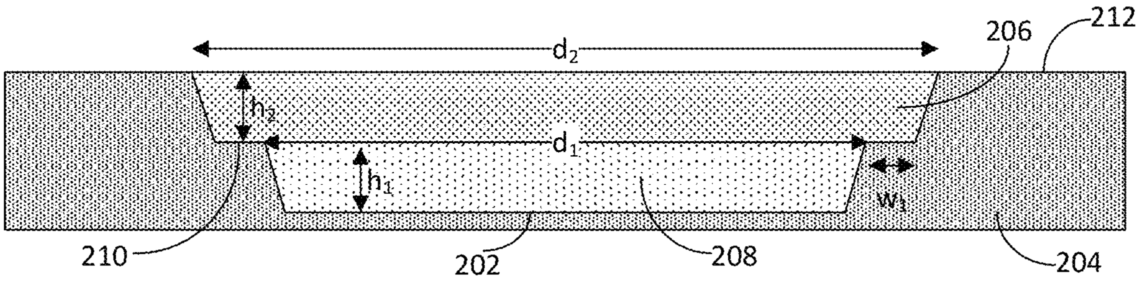
FIGS. 2A and 2B illustrate an example stepped double-well structure according to some embodiments.
Figure 2B:
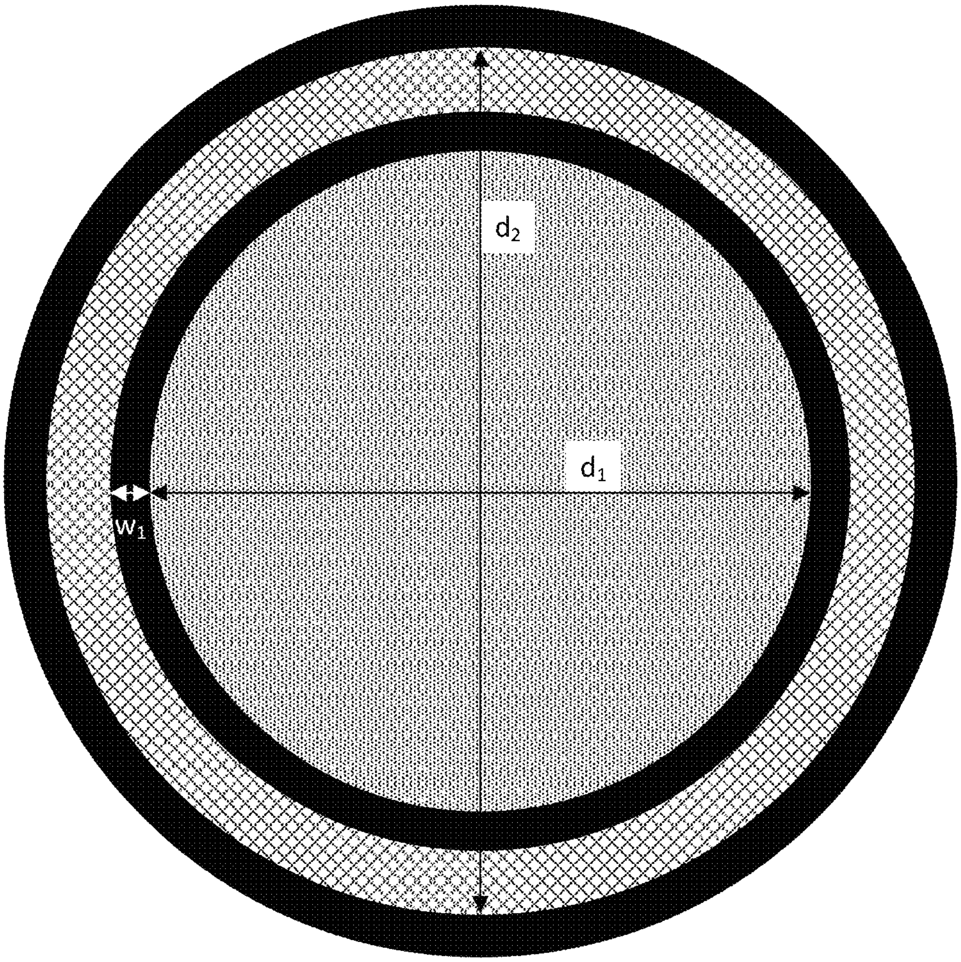
Figure 2C:
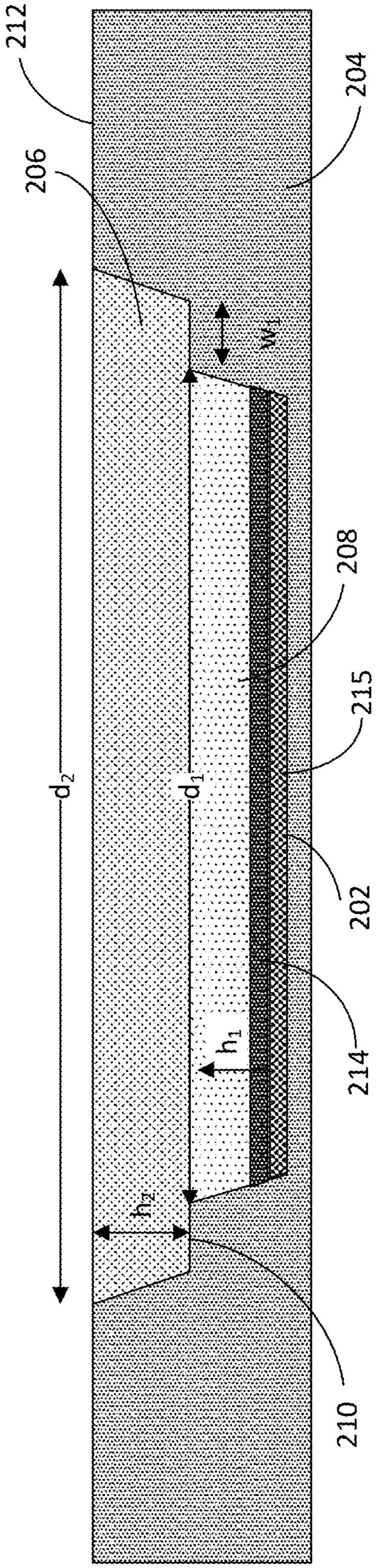
FIG. 2C illustrates the well structure of FIG. 2A with an electrode.

FIGS. 2A-2C illustrate an example stepped double-well structure according to some embodiments. As shown in FIG. 2A, a bottom surface 202 of the well structure can have a stepped structure. The well structure extends into a substrate 204 to second depth at an outer portion 206 and to a first depth that is greater than the second depth at an inner portion 208. The well structure includes a flat step 210 in the outer portion. Accordingly, the depth of the well structure is stepped. The inner portion 208 corresponds to a first well and the outer portion 206 corresponds to a second well. The first well extends from the second well into the substrate. As illustrated in FIG. 2A, the first well has a tapered side wall. The second well can have a tapered side wall as shown in FIG. 2A. In some implementations, the first well, the second well, or both may not have a tapered sidewall.

A first well can have a height $h_1$ from a bottom of the well structure to a flat step 210 of the second well. The first well can have a diameter $d_1$ and can be disposed inside a second well having a height $h_2$ and a diameter $d_2$. The height $h_2$ of the second well extends from a surface 212 of a substrate to the flat step 210. The height $h_1$ of the first well can be greater than, less than, or equal to the height $h_2$ of the second well. The diameter $d_2$ of the second well can be greater than the diameter $d_1$ of the first well. As shown in FIGS. 2A and 2B, there can be a flat step 210 at the limit between the first well and the second well. The step can have a width $w_1$. The values and/or ratios of the parameters $h_1$, $h_2$, $w_1$, $d_1$, and $d_2$ can depend upon various factors, such as one or more of a desired membrane surface area, a desired membrane thickness, properties of the membrane (e.g., viscosity when in a liquid state), and so forth.

FIGS. 2A and 2B illustrate well structures for biosensors. Such biosensors include one or more electrodes. The one or more electrodes can sense an analyte in a solution in the well structure. The one or more electrodes can be any suitable electrode for a particular biosensing application, such as an ion-selective electrode for sensing a particular ion or particular ions in a solution. FIG. 2C shows a biosensor that uses the well structure of FIGS. 2A and 2B. In FIG. 2C, an electrode 215 is disposed at the bottom of the well structure, and a membrane 214 is disposed over the electrode 215. An analyte can pass through the membrane 214 before being detected by the electrode 215.

Figure 3A:
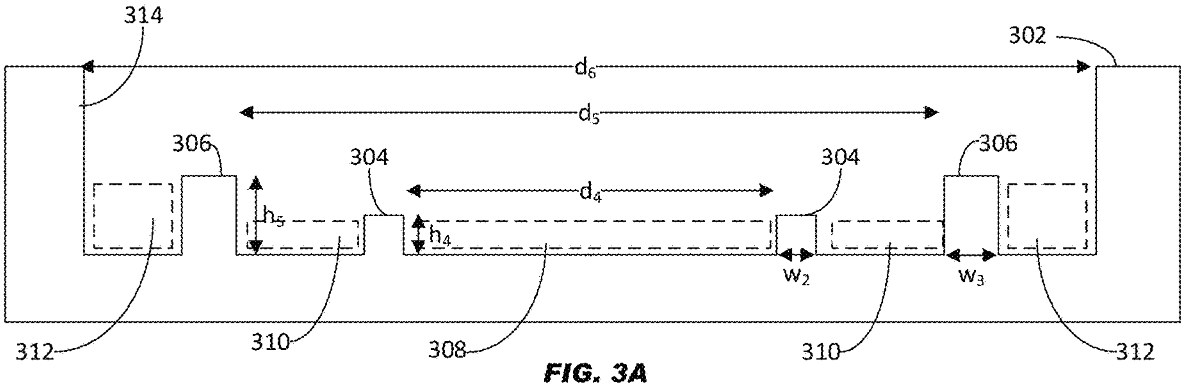
FIGS. 3A and 3B illustrate an example of a double-well structure according to some embodiments.
Figure 3B:
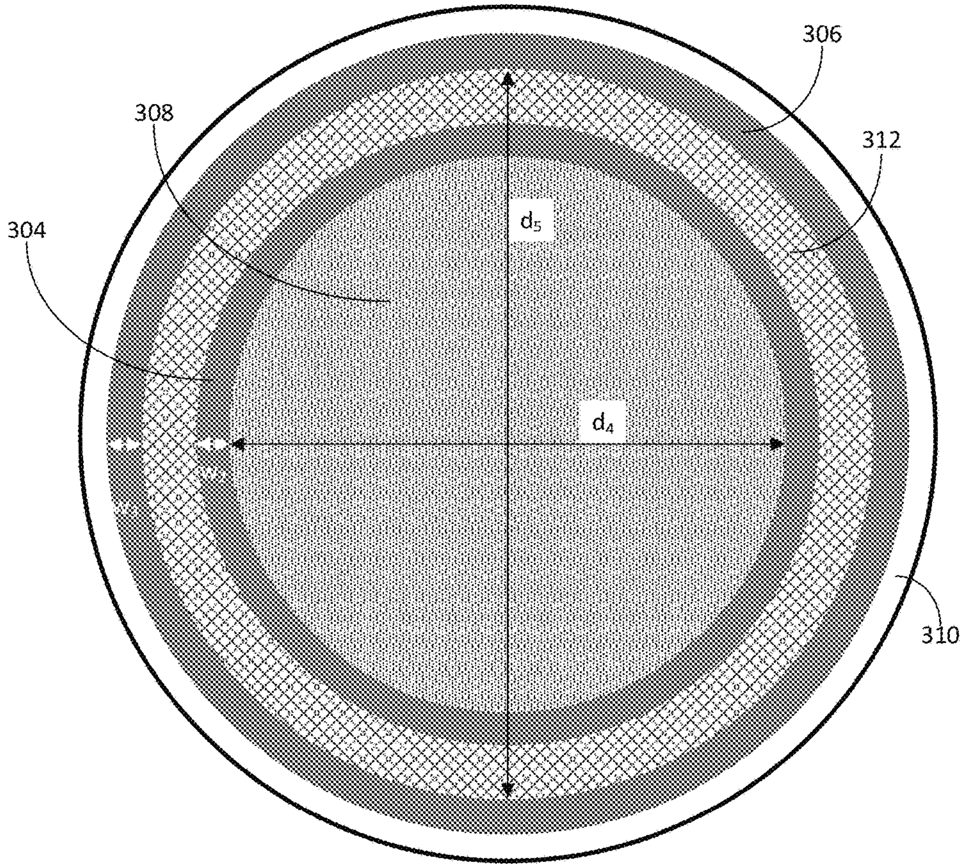

FIGS. 3A and 3B illustrate an example of a double-well structure according to some embodiments. FIG. 3A is a cross-section view, and FIG. 3B is a top-down view. A well structure can include multiple wells defined by pillars or other suitable structures. These wells can be concentric.

A well structure can be formed in a substrate 302. The well structure can include inner pillars 304 and outer pillars 306. The inner pillars 304 can have a height $h_4$ and a width $w_2$. The outer pillars 306 can have a height $h_5$ and a width $w_3$. The inner pillars 304 can have a height that is less than the height of the outer pillars 306 and/or less than an overall depth of the well structure, although other configurations are possible. The inner pillars 304 can define a first well 308 having a diameter $d_4$. A second well 310 having a diameter $d_5$ can be defined between the inner pillars 304 and the outer pillars 306. A third well 312 having a width de can be defined by the outer pillars 306 and an outer edge 314. The second well surrounds the first well and the third well surrounds the second well in plan view.

The pillars can extend from a substrate. The pillars can be formed in a substrate. The pillars can be surrounded by a well within a substrate. The pillars can contain a liquid or gel within the first well, the second well, and the third well.

In some embodiments, the height of a pillar can be about the same as the height of the well structure (e.g., about as deep as the well). In some embodiments, a pillar can have a height that is shorter than the height of the well structure. In some embodiments, a pillar can have a height that is greater than the height of the well structure.

It will be appreciated that the number of wells can vary. For example, in some embodiments, a well structure can include two wells, three wells, four wells, five wells, or more as desired. In some embodiments, the number of wells, the thickness of walls and/or other features, the difference in height of steps, the difference in width of wells, and so forth can vary based on, for example, an overall biosensor device size, total well size, total well volume, total well height, the solution to be dispensed into the well, and so forth. For example, in some embodiments, a solution may be more or less hydrophilic, more or less viscous, and so forth, which can impact how the solution fills the well, how flat the surface is, and so forth.

Figure 3C:
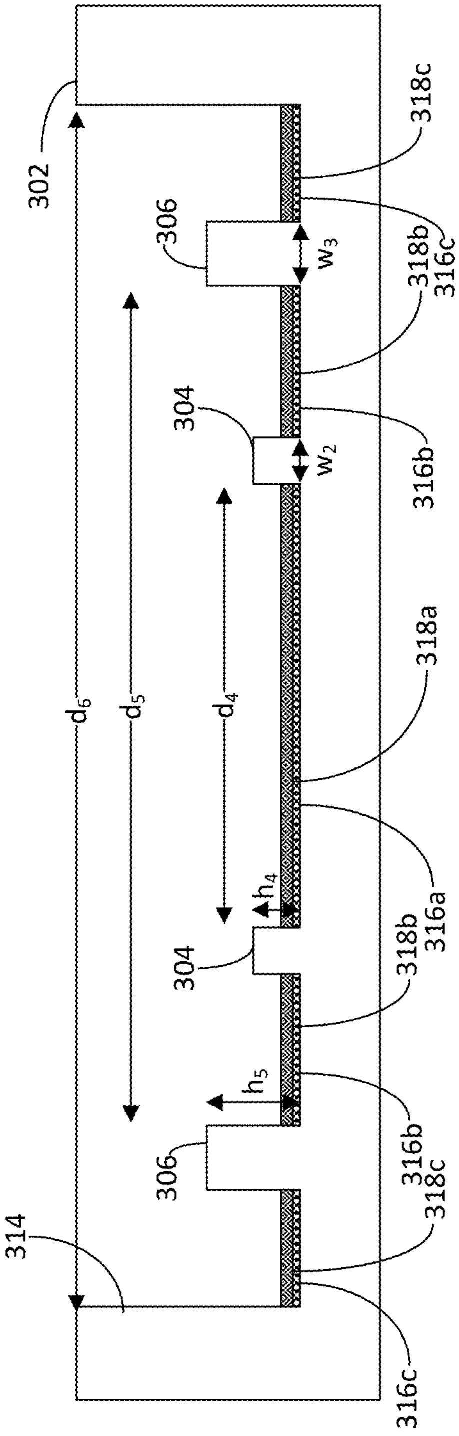
FIG. 3C illustrates the well structure of FIG. 3A with electrodes.

FIG. 3C shows a biosensor that uses the well structure of FIGS. 3A and 3B. In FIG. 3C, electrodes and membranes are disposed in each well. Sensors 316*a*, 316*b*, and 316*c* are disposed in the bottom of the first, second, and third wells, respectively. Membranes 318*a*, 318*b*, and 318*c* are disposed on top of the sensors 316*a*, 316*b*, and 316*c*, respectively. In some embodiments, the membranes 318*a*, 318*b*, 318*c* can be the same and/or the sensors 316*a*, 316*b*, 316*c* can be the same. In some embodiments, one or more of the membranes and/or one or more of the sensors can be different from one or more of the other membranes and/or sensors. In certain applications, the well structure can include sensor(s) in a subset of the wells of the well structure. As one example, a well structure can include a sensor in a first well and not include a sensor in a second well that surrounds the first well. In some embodiments, the first well (e.g., the well defined by the inner pillars 304) can contain a first liquid, the second well (e.g., the well defined by the inner pillars 304 and the outer pillars 306) can contain a second liquid, and/or the third well (e.g., the well defined by the outer edge 314 and the outer pillars 306) can contain a third liquid. In some embodiments, any of the first, second, and third liquids can be the same liquid. One of more of the first, second, and third liquids can be different liquids. One of more of the first, second, and third wells can include different phases.

While FIGS. 2A-3C illustrate circular wells, it will be appreciated that the present disclosure can be applied to wells of any suitable shape, including ovals, squares, rectangles, or any other suitable shape. Moreover, while symmetric wells are depicted in FIGS. 2A-3C, it will be appreciated that such asymmetric wells can alternatively be implemented in certain applications.

Figure 4:
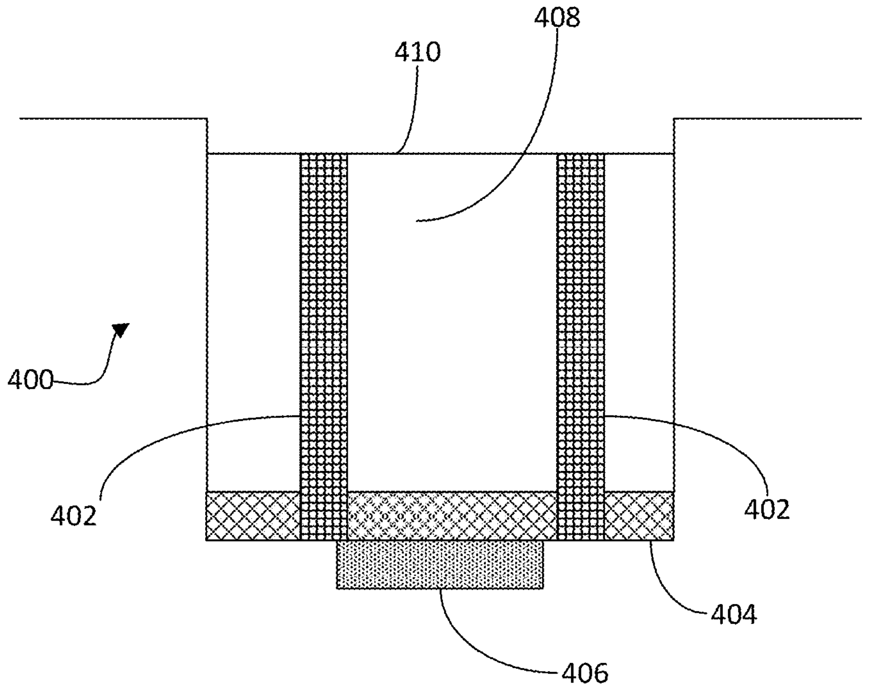
FIG. 4 illustrates a side view of a well with pillars disposed therein.

FIG. 4 illustrates a side view of biosensor structure with pillars disposed therein according to an embodiment. In FIG. 4, the well structure 400 can include pillars 402. A membrane 404 can be disposed at the bottom of the well. The membrane 404 can be a solid membrane. In certain applications, the bottom of pillars 402 can be covered by the membrane 404. An electrode 406 can be disposed under the membrane 404. In certain embodiments, the membrane 404 may be disposed directly on the electrode 406. In some other embodiments, one or more intervening layers may be disposed between the membrane 404 and the electrode 406. For example, in some embodiments, an electrolyte can be disposed between the membrane 404 and the electrode 406 for ion-sensitive field-effect transistor (ISFET) applications. An electrolyte may be used in the case of, for example, oxygen and/or glucose sensing. A solution 408 can be placed in the well structure 400. The solution 408 can have a relatively flat top surface 410, which can be achieved by the presence of the pillars 402.

The membranes shown in FIGS. 2C, 3C, and 4 are relatively thin as compared to the membranes shown in FIGS. 1A-C. The membrane thickness can vary. In some embodiments, the membrane thickness can be relatively thin such that a majority of the volume of the well structure is available for containing a liquid to be analyzed. In some embodiments, the membrane thickness can be relatively thick such that a majority of the volume of the well structure is taken up by the membrane. Any suitable membrane thickness may be used for a particular application. In amperometric measurements, there can be an inverse correlation between the thickness of the membrane and the maximum biosensor current. A thicker membrane may take a longer time to reach a steady enzymatic rate (e.g., a steady current). A thicker membrane may provide for higher selectively of a target analyte.

While the well structures discussed above can be used to form more uniform membranes and/or to obtain more uniform sample thickness, there may still be nonuniformities in thickness. For example, non-uniformities can be pronounced at or near edges of the well structure, such as at or near a sidewall of the well structure (e.g., an outer sidewall, a sidewall of a pillar, and so forth). In some embodiments, one or more well surfaces can be textured, which may reduce non-uniformities near the surface. In certain embodiments, texture can be integrally formed with the well, for example as part of a molding or other manufacturing process. In some embodiments, texture can be applied to a well surface in a later processing step, for example by way of chemical or physical etching. Textures, microstructures, and/or nanostructures in accordance with any suitable principles and advantages disclosed herein can be included in multi-well structures (e.g., well structures of FIGS. 2A-4) and/or in single well structures.

Texture size can play a significant role in the interaction of a fluid with a textured surface. For example, hydrophobicity can present technical challenges in the design of a biosensor device. For example, in a patterned well, the patterning can result in more or less pronounced hydrophobic behavior by an analyte solution.

In some embodiments, microstructures and/or nanostructures can be used to improve adhesion of a membrane. For example, the microstructures and/or nanostructures can operate as, for example, trusses or other support structures for the membrane. In some embodiments, a well bottom surface can be patterned with, for example, a checkerboard pattern, grid pattern, or other pattern. In some embodiments, microstructures and/or nanostructures can be included on a sidewall of the well. In some implementations, microstructures and/or nanostructures can have non-circular edges.

In some embodiments, microstructures and/or nanostructures can have a minimum and/or maximum major dimension. For example, if such structures are too small, solutions placed on the structures can exhibit superhydrophobic behavior. For example, in some embodiments, an adhesion structure can have a dimension of about 10 microns or greater. Such a structure can be advantageous when hydrophobic behavior is not desired or may have smaller features when hydrophobic behavior is desired, for example, to promote flow of a solution matrix. In certain applications, an adhesion structure can have a diameter on the order of 10s of microns. In some other applications, an adhesion structure can have a diameter in a range from 1 micron to 10 microns. According to some other applications, an adhesion structure can have a diameter in a range from 100 microns to 900 microns. In some embodiments, a well structure may include texture features of different sizes. For example, relatively large structures may be used in some areas to increase adhesion, while relatively small structures may be used to promote fluid flow.

Figure 5A:
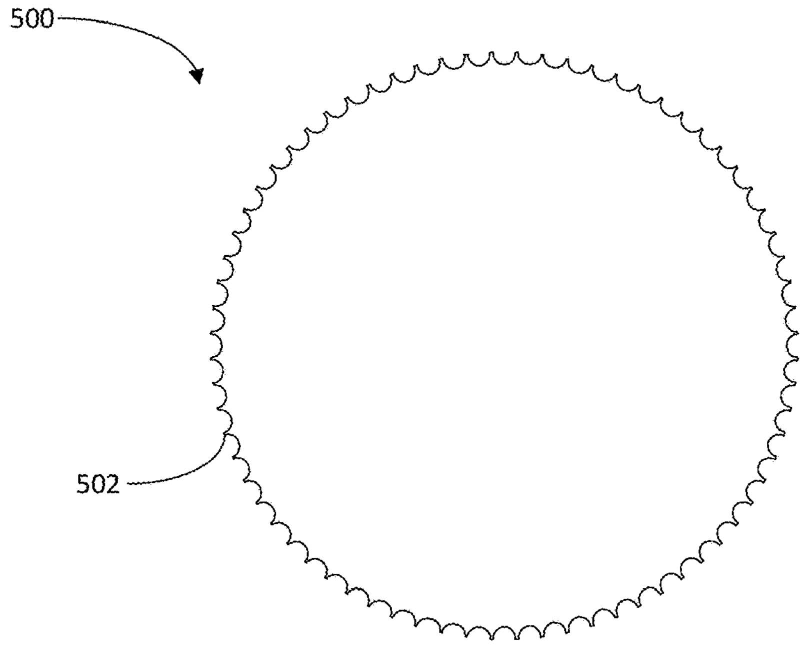
FIG. 5A is a top-down view of a well structure according to some embodiments.

FIG. 5A is a top-down view of a well structure according to some embodiments. As shown in FIG. 5A, the well structure 500 can have a sidewall 502 that is not smoothly shaped and instead has a textured surface. While illustrated as a uniform distribution of semicircular features in FIG. 5A, the sidewall surface texture can have features with any other suitable shapes and/or have a non-periodic pattern. For example, in some embodiments, features of random shapes and/or sizes can be used. In some embodiments, sizes of features can be within a defined range, such as tens of nanometers or hundreds of nanometers. For example, in some embodiments, a texture feature can be formed by roughening a surface and may have a major dimension of from about 5 nm to about 25 nm. In some embodiments a textured surface may have lithographically defined features with a major dimension of from about 50 nm to about 1000 nm.

Figure 5B:
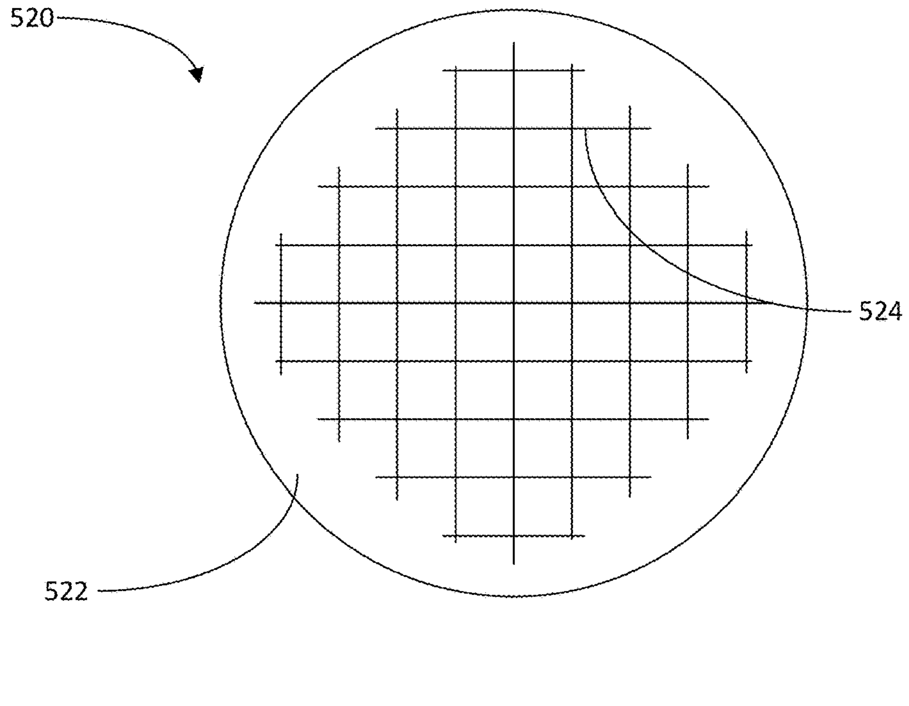
FIG. 5B is a top-down view of another well structure according to some embodiments.

FIG. 5B is a top-down view of another well structure according to some embodiments. As shown in FIG. 5B, the bottom surface 522 of the well structure 520 can have a texture 524. In FIG. 5B, the texture 524 is shown in the form of a hatched or checkerboard pattern. It will be appreciated, however, that other patterns are also possible. In some embodiments, the texture 524 may not have a regular pattern. In some embodiments, the texture 524 may have a regular size. In some embodiments, the texture 524 may have sizes distributed within a pre-determined range, for example from about 50 nm to about 500 nm.

As mentioned above, the size of a texture feature can impact the behavior of a liquid disposed thereon. For example, surfaces with very small textures can exhibit hydrophobic or superhydrophobic behavior. FIGS. 6A-6D illustrate examples of textures according to some embodiments. Texture features of FIGS. 6C-6D can be nanostructures and/or microstructures that decrease surface adhesion and/or result in more uniform liquid profiles.

Figure 6A:
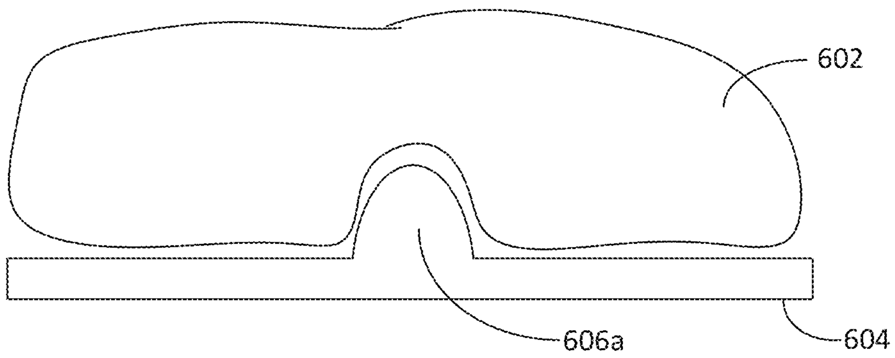
FIGS. 6A-6D illustrate examples of textures according to some embodiments.

In FIG. 6A, a liquid 602 is disposed on a surface 604 having a texture feature 606*a*. The texture feature 606*a* can be relatively large, and the liquid 602 can generally conform to the shape of the surface 604 and the texture feature 606*a*.

Figure 6B:
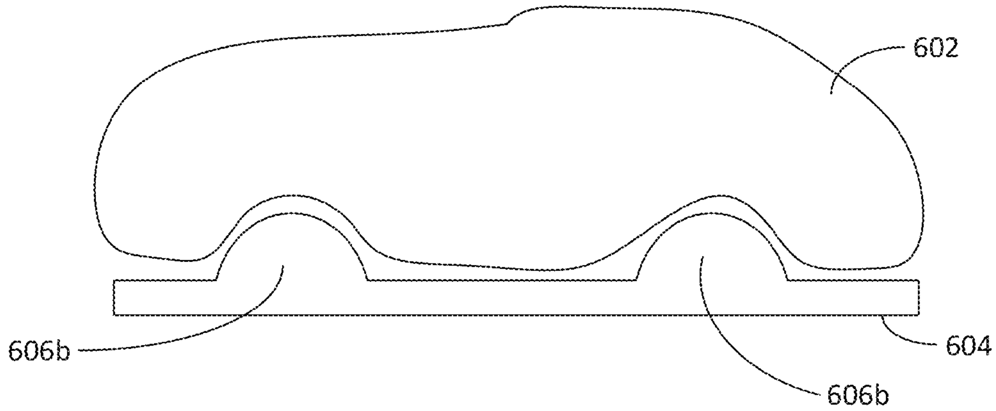

In FIG. 6B, two texture features 606*b* are illustrated. The two texture features 606*b* can be relatively large, and the liquid 602 can generally conform to the shape of the surface 604 and the two texture features 606*b*.

Figure 6C:
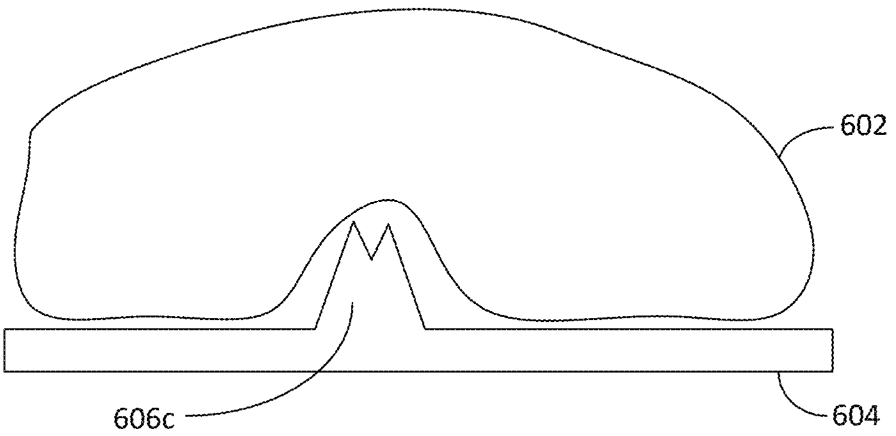

In FIG. 6C, a texture feature 606*c* with relatively small feature sizes is shown. As shown in FIG. 6C, the liquid 602 does not extend into the crevices of the texture feature 606*c* but instead sits atop the texture feature 606*c*.

Figure 6D:
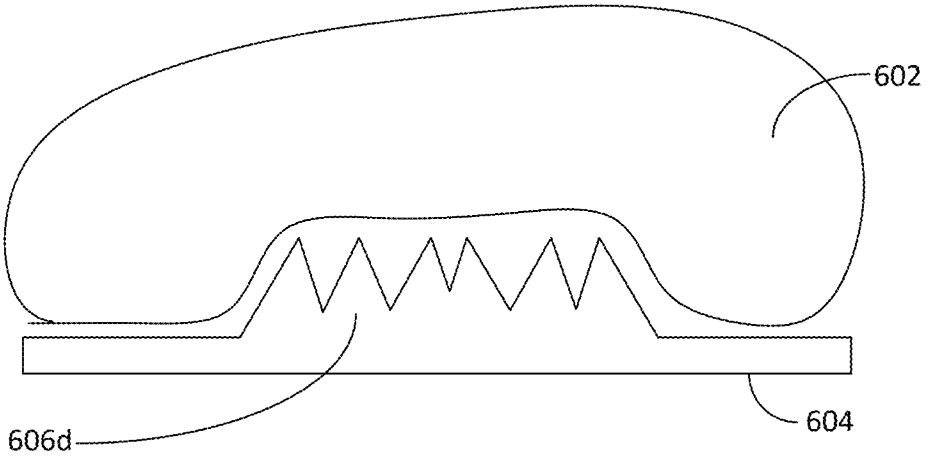

FIG. 6D is another example with a texture feature 606*d*. The texture feature 606*d* can have relatively small features sizes. As shown in FIG. 6D, the liquid 602 does not flow into the crevices of the texture feature 606*d*.

Texture features such as those illustrated in FIGS. 6C-6D can result in a hydrophobic or superhydrophobic surface, such that liquid flows relatively freely over the surface. Conversely, textures such as those illustrated in FIGS. 6A-6B can present barriers to flow. The texture features of FIGS. 6A-6D can be implemented on any suitable surface of a well structure disclosed herein. For example, in certain applications, texture features of FIGS. 6C and/or 6D can be implemented when hydrophobic or superhydrophobic surfaces are desired.

While approaches described above can provide better adhesion, flatter surfaces, increased fluid flow, and/or other benefits, an overall exposed surface area of a membrane can be limited by the surface area of the well. For example, for a circular well with a diameter d, the maximum surface area of a membrane that extends to the edges of the well can be limited to $\pi(d/2)^2$. In some cases, it may be desirable to increase the exposed surface area of the membrane, for example to provide greater surface area for analyte to enter into the membrane and traverse the membrane to an electrode. In some embodiments, amperometric sensing can be improved by increasing the exposed surface area of the membrane. For example, an increase in exposed surface area can result in an increase in the maximum current.

In some embodiments, an exposed surface area of a membrane can be increased by, for example, providing the membrane in a well having a jagged or otherwise irregularly shaped sidewall, such that at least some of the side surfaces of the membrane are exposed. In some embodiments, the surface tension of a membrane when in a liquid state can be utilized to form a membrane that does not extend into depressions, cutouts, and/or the like that may be present along the sidewalls of a well.

Figure 7A:
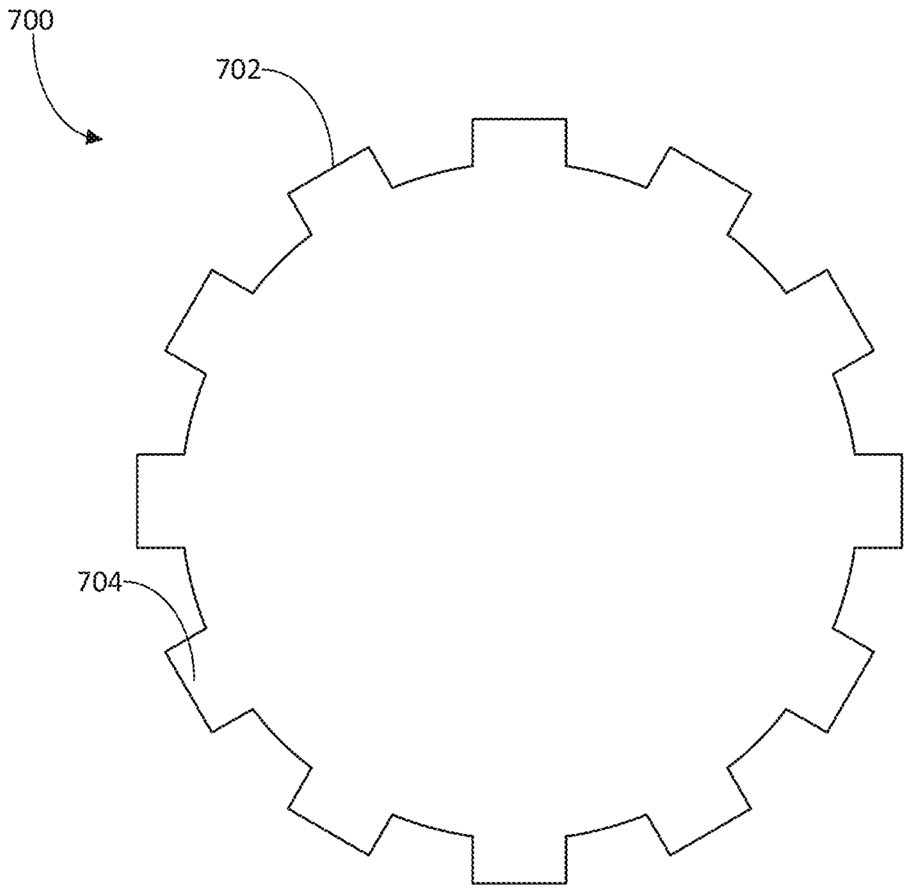
FIG. 7A is a top-down view of a well according to some embodiments.

FIG. 7A is a top-down view of a well according to some embodiments. As shown in FIG. 7A, the sidewall 702 of the well 700 can have an irregular or uneven shape with outward depressions 704. As discussed above, in some embodiments, a membrane material may not flow into the outward depressions 704 or may flow only partially into the outward depressions 704, such that a side surface of the membrane is at least partially exposed. In some embodiments, the outward depressions 704 can have a width and/or depth of from about 10 nm to about 500 nm.

Figure 7B:
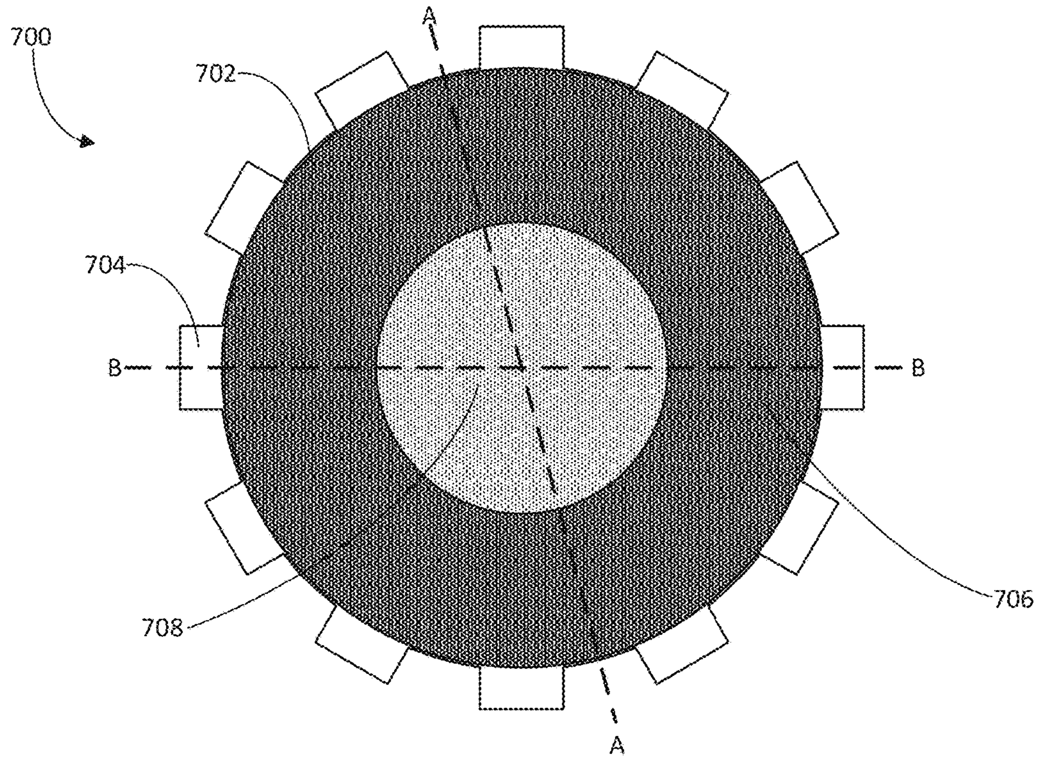
FIG. 7B-7D illustrate an example of sensor device according to some embodiments.
Figure 7C:
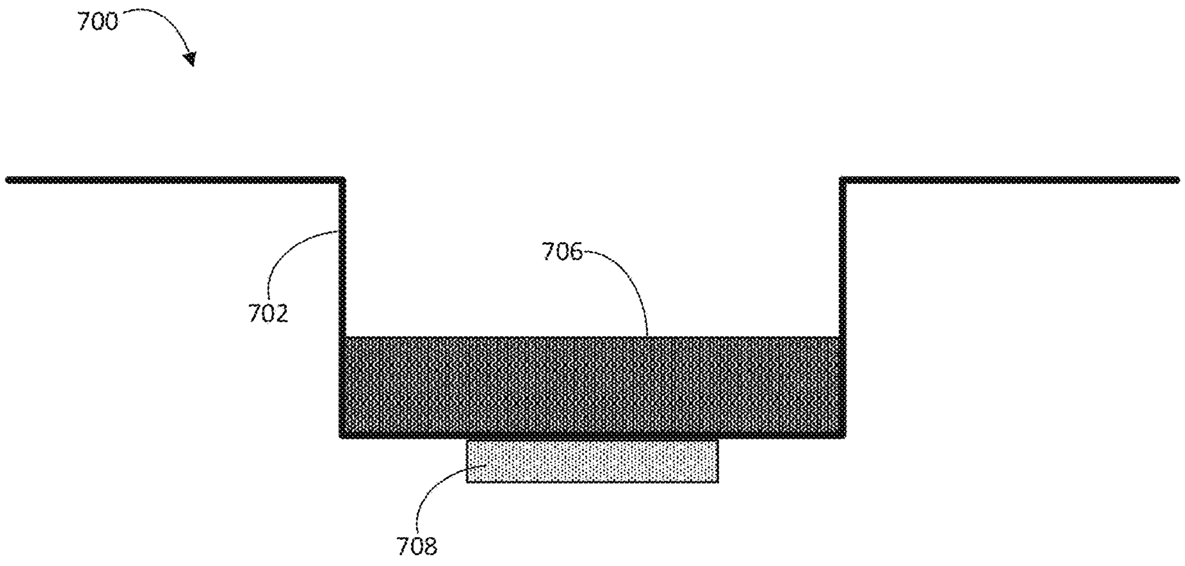
Figure 7D:
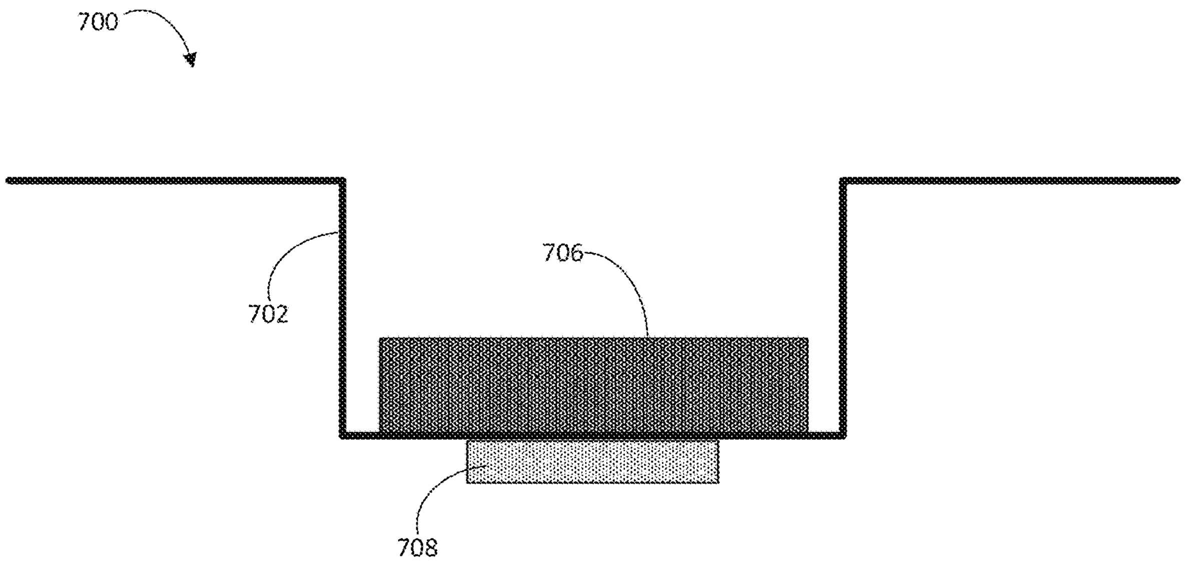

FIG. 7B-7D illustrate an example of sensor device according to some embodiments. In FIG. 7B, the well 700 can have a sidewall 702 that is uneven. A membrane 706 can be disposed within the well 700. An electrode 708 can be disposed below the membrane 706, for example at a bottom surface of the well 700. As shown in FIG. 7B, in some locations, the membrane 706 can be in contact with the sidewall 702 along at least some portions of the sidewall 702, for example, along narrowest portions of the well while not being in contact with other portions of the sidewall 702. FIG. 7C shows a side view of the well 700 through the line A-A of FIG. 7B, in which the membrane 706 is in contact with the sidewall 702. FIG. 7D shows a side view of the well 700 through the line B-B of FIG. 7B, in which the membrane 706 is not in contact with the sidewall 702.

Figure 7E:
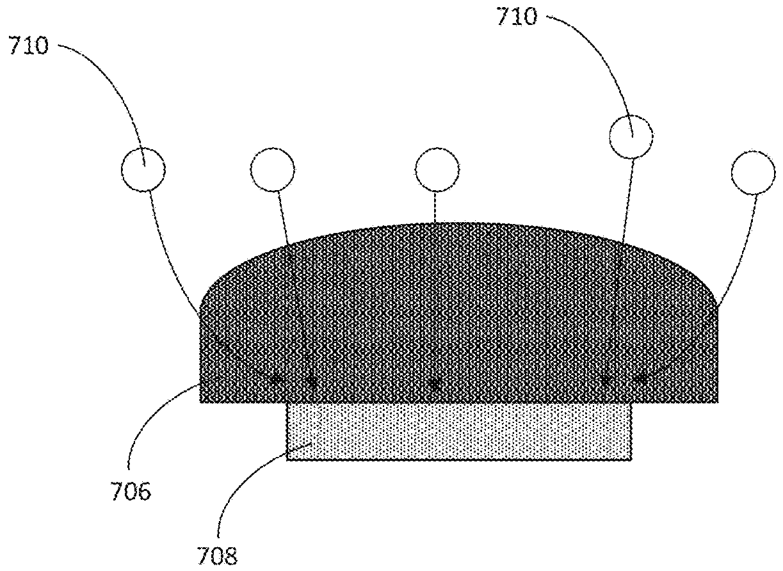
FIG. 7E is a side view of a portion the well.

FIG. 7E is a side view of a portion the well 700. FIG. 7E. In FIG. 7E, the sides of the membrane 706 are exposed, as shown in FIGS. 7A and 7C. As shown in FIG. 7E, when the sides of the membrane 706 are exposed, there can be additional surface area available for analytes 710 to pass through the membrane 706 toward the electrode 708.

In FIGS. 7A-7E, a single well is depicted for clarity. However, it will be appreciated that a multi-well structure can include the same or similar features. For example, an outer sidewall may have outward depressions or other features that render the surface non-smooth. Similarly, in some embodiments, pillars, steps, and/or one or more other features of a multi-well structure may have non-smooth shapes.

In some embodiments, in addition to the approaches above or alternatively to the approaches above, the surface energy of one or more surfaces of a well structure can be increased to improve adhesion, for example, using one or more of a surfactant, plasma treatment, or the like. In some embodiments, one or more surfactants can be used during manufacturing to increase adhesion between membranes, electrodes, well walls, and/or other features. In some embodiments, a surfactant can include, for example, tween surfactants (e.g., surfactants containing hydrophilic ethylene glycol head groups and hydrophobic alkyl tails), a nonionic surface (e.g., Triton), sodium dodecyl sulfate, CHAPS, and/or other surfactants.

In the embodiments described above, apparatuses, systems, and methods for biosensing are described in connection with particular embodiments. It will be understood, however, that the principles and advantages of the embodiments can be used for any other systems, apparatus, or methods with a need for multi-well structures and/or well structures with texture features.

Unless the context clearly requires otherwise, throughout the description and the claims, the words "comprise," "comprising." "include," "including." and the like are to be construed in an inclusive sense, as opposed to an exclusive or exhaustive sense; that is to say, in the sense of "including, but not limited to." Additionally, the words "herein," "above," "below," and words of similar import, when used in this application, shall refer to this application as a whole and not to any particular portions of this application. Where the context permits, words in the Detailed Description using the singular or plural number may also include the plural or singular number, respectively. The word "or" in reference to a list of two or more items, is intended to cover all of the following interpretations of the word: any of the items in the list, all of the items in the list, and any combination of the items in the list. All numerical values provided herein are intended to include similar values within a measurement error.

Moreover, conditional language used herein, such as, among others, "can," "could." "might." "may." "e.g.," "for example," "such as" and the like, unless specifically stated otherwise, or otherwise understood within the context as used, is generally intended to convey that certain embodiments include, while other embodiments do not include, certain features, elements and/or states.

The teachings provided herein can be applied to other systems, not necessarily the systems described above. The elements and acts of the various embodiments described above can be combined to provide further embodiments. The acts of the methods discussed herein can be performed in any order as appropriate. Moreover, the acts of the methods discussed herein can be performed serially or in parallel, as appropriate.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions, and changes in the form of the methods and systems described herein may be made without departing from the spirit of the disclosure. For example, while the disclosed embodiments are presented in given arrangements, alternative embodiments may perform similar functionalities with different components and/or circuit topologies, and some elements may be deleted, moved, added, subdivided, combined, and/or modified. Each of these elements may be implemented in a variety of different ways as suitable. Any suitable combination of the elements and acts of the various embodiments described above can be combined to provide further embodiments. The accompanying claims and their equivalents are intended to cover such forms or modifications as would fall within the scope and spirit of the disclosure. Accordingly, the scope of the present inventions is defined by reference to the claims.

What is claimed is:

1. A biosensor structure comprising:

a well structure comprising a first well and a second well, wherein a geometry of the well structure impacts where a solution dispensed into the well structure is located, wherein the well structure comprises a surface including at least one of a nanostructure or a microstructure thereon to decrease adhesion of the solution, wherein the first well is disposed within the second well such that the first well and the second well extend to different depths relative to a surface of the substrate, wherein the second well has a greater diameter than the first well, and wherein the first well and the second well each comprise a respective tapered sidewall;

an electrode configured to sense an analyte in the solution, the electrode disposed at a bottom of the well structure; and a membrane positioned on the electrode and on at least part of a bottom surface of the well structure.

2. The biosensor structure of claim 1, wherein at least part of the membrane is disposed directly on the bottom surface of the well structure.

3. The biosensor structure of claim 1, wherein the membrane is arranged such that a liquid in the biosensor structure can only reach the electrode by passing through the membrane.

4. The biosensor structure of claim 1, further comprising a second membrane, wherein the first membrane is within the first well, and wherein the second membrane is within the second well.

5. The biosensor structure of claim 1, wherein the well structure comprises a step extending from the tapered sidewall of the first well to the tapered sidewall of the second well.

6. The biosensor structure of claim 1, wherein the well structure comprises a first wall having a first height and a first width, and the first wall separates the first well and the second well.

7. The biosensor structure of claim 6, further comprising a second wall having a second height and a second width, the second wall defining an outer boundary of the second well.

8. The biosensor structure of claim 7, wherein the first wall is at a first distance from a center of the well structure, wherein the second well is at a second distance from the center of the well structure, wherein the second distance is greater than the first distance.

9. The biosensor structure of claim 1, wherein the electrode is an ion-selective electrode.

10. The biosensor structure of claim 1, wherein the first well and the second well are concentric.

11. A biosensor structure comprising:

a well structure comprising a first well and a second well, wherein the first well and the second well are stepped concentric wells, wherein the well structure comprises a surface including at least one of a nanostructure or a microstructure thereon to decrease adhesion of the solution, wherein the first well is disposed within the second well such that the first well and the second well extend to different depths relative to a surface of the substrate, wherein the second well has a greater diameter than the first well, and wherein the first well and the second well each comprise a respective tapered sidewall;

an electrode configured to sense an analyte in a solution in the well structure; and a membrane positioned on the electrode.

12. A biosensor structure comprising:

a well structure comprising a first well, a second well, and a pillar disposed between the first well and the second well, wherein the well structure comprises a surface including at least one of a nanostructure or a microstructure thereon to decrease adhesion of the solution, wherein the first well is disposed within the second well such that the first well and the second well extend to different depths relative to a surface of the substrate, wherein the second well has a greater diameter than the first well, and wherein the first well and the second well each comprise a respective tapered sidewall;

an electrode configured to sense an analyte in a solution in the well structure; and a membrane positioned on the electrode, wherein the first well and the second well are concentric, and wherein the second well surrounds the first well in plan view.

13. The biosensor structure of claim 12, wherein a height of the pillar is less than a total depth of the well structure.

* * * * *